United States Patent
Reddy

(10) Patent No.: US 12,307,288 B2
(45) Date of Patent: May 20, 2025

(54) DISTRIBUTED AI PLATFORM MESH FOR MACHINE LEARNING WORKFLOWS

(71) Applicant: SAP SE, Walldorf (DE)

(72) Inventor: Srinivasa Byaiah Ramachandra Reddy, Bangalore (IN)

(73) Assignee: SAP SE, Walldorf (DE)

( * ) Notice: Subject to any disclaimer, the term of this patent is extended or adjusted under 35 U.S.C. 154(b) by 625 days.

(21) Appl. No.: 17/677,588

(22) Filed: Feb. 22, 2022

(65) Prior Publication Data

US 2023/0266996 A1   Aug. 24, 2023

(51) Int. Cl.
  *G06F 9/46*   (2006.01)
  *G06F 9/48*   (2006.01)
  *G06N 20/00*  (2019.01)

(52) U.S. Cl.
  CPC ........... *G06F 9/4881* (2013.01); *G06N 20/00* (2019.01)

(58) Field of Classification Search
  CPC ............................. G06F 9/4881; G06N 20/00
  See application file for complete search history.

(56) References Cited

U.S. PATENT DOCUMENTS

| | | | |
|---|---|---|---|
| 10,554,817 B1* | 2/2020 | Sullivan | H04L 41/5054 |
| 2021/0157622 A1 | 5/2021 | Ananthapur Bache et al. | |
| 2022/0237505 A1* | 7/2022 | Feldman | G06F 9/45558 |

\* cited by examiner

*Primary Examiner* — Gregory A Kessler
(74) *Attorney, Agent, or Firm* — Klarquist Sparkman, LLP

(57) ABSTRACT

An AI platform mesh includes a machine learning control plane hosted in a container orchestration cluster. The machine learning control plane includes a worker plane manager and a set of machine learning services. One or more remote runtime environments configured to execute machine learning workloads can be registered with the machine learning control plane via the worker plane manager. The remote runtime environments can communicate with the set of machine learning services via the worker plane manager.

17 Claims, 7 Drawing Sheets

DISTRIBUTED AI PLATFORM MESH FOR MACHINE LEARNING WORKFLOWS

FIELD

The field generally relates to artificial intelligence (AI) platforms and providing AI platform services to multiple tenants.

BACKGROUND

AI platforms provide tools to build, deploy, and manage machine learning models in the cloud. It is typically not possible to deploy an entire set of tools of an AI platform in a local environment of a tenant (e.g., due to restrictions of licensing agreements and/or intellectual property rights and support for cloud computing service models). As a result, the tools of an AI platform are commonly provided in a dedicated single multi-tenant cluster with nodes that can be hyperscaled. However, there are challenges with providing machine learning capabilities in a shared cluster setup.

Therefore, there continues to be need for improvement in providing AI platform services to multiple tenants.

DETAILED DESCRIPTION

Example I—Overview

Examples of challenges with providing machine learning capabilities to multiple tenants in a shared cluster setup can include lack of guarantee of autoscaling behavior under service level agreements, performance issues stemming from shared network infrastructure, performance issues stemming from load on the API server of the cluster, and complicated tenancy isolation. For example, a shared cluster is commonly created with only one underlying hyperscaler cloud account with a Hyperscaler platform (such as AWS, AZURE, Google Cloud, or the like). Auto-scaling on these platforms varies based on cloud account, region, zones, and current cluster capacity. Auto-scaling of nodes has a direct impact on the scheduling time of machine learning workloads in the shared cluster. If a tenant has a service license agreement with a specific auto-scaling behavior, it would not be possible to guarantee this auto-scaling behavior where the shared cluster is governed by one underlying hyperscaler cloud account. There may be situations, for example, where a tenant is left waiting for new nodes instead of receiving the auto-scaling behavior in the service agreement for the tenant.

Described herein are technologies for orchestrating machine learning workflows for multiple tenants. The technologies provide a global control plane and allow tenants to connect their own worker planes to the global control plane. The global control plane can provide machine learning services such as training of machine learning models. The worker planes can create and manage machine learning workloads locally, which can be advantageous for performance, data privacy, and compliance reasons. The worker planes can run low latency workloads locally, while latency insensitive workloads, such as training of machine learning models, can be run in the global control plane. Since the worker planes can run machine learning workloads locally, the tenants are guaranteed auto-scaling behaviors with their own cloud infrastructure, and there will be no load on the API server of the global control plane due to the machine learning workloads running in the separate worker planes. Since the global control plane and the worker planes are not in a shared cluster, the need for complicated tenancy isolation is avoided.

Example II—Example Distributed AI Platform Mesh

Figure 1:
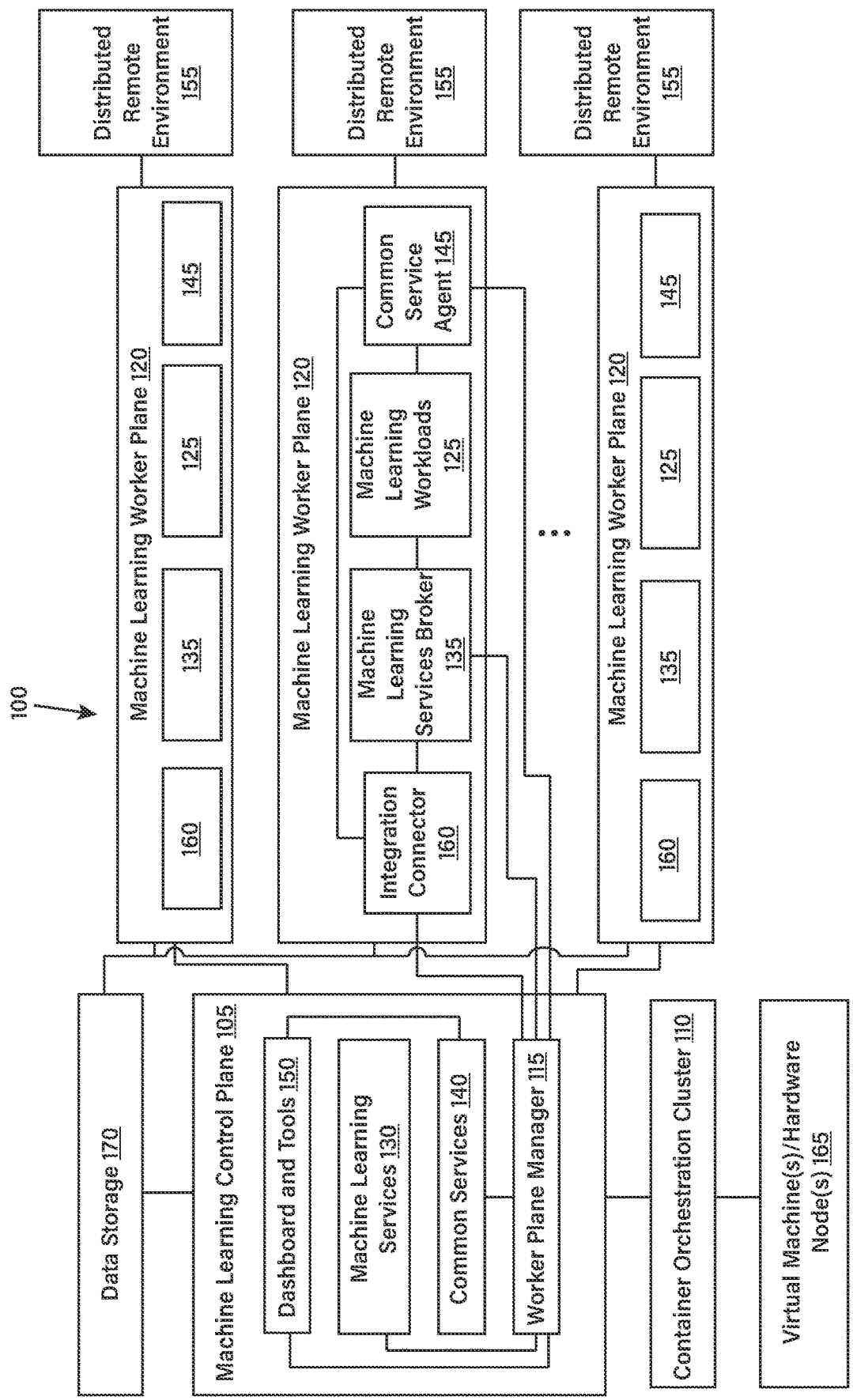
FIG. 1 is a block diagram of an example distributed AI platform mesh.

FIG. 1 is a block diagram of an example distributed AI platform mesh 100 that can support end-to-end machine learning workflows for one or more tenants.

The distributed AI platform mesh 100 includes a machine learning control plane 105 that orchestrates (e.g., automatically configures, coordinates, and manages) workload, lifecycle, and operational aspects of a machine learning process. The machine learning control plane 105 can run in a container orchestration cluster 110, which can be an installation of any suitable container orchestration system (e.g., KUBERNETES, OPENSHIFT, or DOCKER SWARM) running as a layer on virtual machine(s) or hardware node(s) 165.

The machine learning control plane 105 can be implemented as a set of containerized microservices. A microservice can take the form of a small independent, loosely coupled component, such as an API server or UI application. For example, where KUBERNETES is used as the container orchestration platform, a microservice can be deployed as a "Kubernetes deployment" in the container orchestration cluster 110. The Kubernetes deployment creates several "replica pods" in the container orchestration cluster 110. A replica pod can contain one or more running containers (e.g., Docker containers) running the machine learning control plane applications. The cluster has worker nodes that run the applications deployed in the cluster. The replica pods are created on the worker nodes. A Kubernetes cluster has a control plane that manages and controls the cluster and worker nodes. However, the machine learning control plane 105 is different from the control plane of the Kubernetes cluster (e.g., the machine learning control plane 105 is in a layer above the container orchestration layer).

The machine learning control plane 105 includes a worker plane manager 115 that can be used to register one or more machine learning worker planes 120. Herein, the term "machine learning worker plane" refers to a remote runtime environment (or platform) that offers resources to execute machine learning workloads (e.g., inference, training, model monitoring, explainers, etc.). In one example, a tenant can register a machine learning worker plane 120 by accessing a user interface of the worker plane manager 115 (for example, via a URL) and providing metadata, credentials, and configurations of the machine learning runtime environment of the machine learning worker plane 120 to the worker plane manager 115. An example implementation and operation of the worker plane manager 115 is described in Example IV.

The machine learning control plane 105 can include machine learning services 130 to develop and operationalize a machine learning pipeline or manage a machine learning life cycle. In one example, the machine learning services 130 can include preprocessing machine learning data, training of machine learning models, deploying trained models (e.g., as a Web service), managing machine learning artifacts (e.g., datasets and models), and managing machine learning workflows. The machine learning services 130 can be provided by Machine Learning as a Service (MLaaS) platforms (e.g., SAP AI Core, AZURE, Google Cloud ML, etc.). In some cases, the machine learning control plane 105 can have more than one set of machine learning services (e.g., machine learning services from different MLaaS platforms).

The worker plane manager 115 can deploy a machine learning service broker 135 to a registered machine learning worker plane 120. The machine learning service broker 135 can create and manage machine learning workloads 125 in the machine learning worker plane 120. While the machine learning worker plane 120 is connected to the machine learning control plane 105 via the worker plane manager 115, the machine learning services 130 can communicate with the machine learning service broker 135. For example, the machine learning services 130 and the machine learning service broker 135 can exchange information about training of machine learning models on the machine learning control plane 105 or on the machine learning worker plane 120. In another example, the machine learning services 130 can send commands to the machine learning service broker 135 that result in generation of machine learning workloads 125 on the machine learning worker plane 120.

The machine learning worker plane 120 runs in a distributed remote environment 155, which can be any of Edge, Cloud (or public cloud), or On-Premise (or private cloud) environment. The machine learning worker plane 120 can include an integration connector 160 to enable communication between the machine learning worker plane 120 and the machine learning control plane 105. The integration connector 160 can be an endpoint of a bidirectional communication service, such as a synchronization service or message queue (e.g., SAP Cloud Connector, SAP Business object sync service, RabbitMQ Message Queue, Kafka, etc.). The other endpoint of the synchronization service or message queue service (or other bidirectional communication service) can be integrated with the worker plane manager 115. The worker plane manager 115 can support the different types of integration connectors 160 that can be used by the machine learning worker planes 120.

In examples where the machine learning service broker 135 is running in a cloud environment without a firewall, the worker plane manager 115 can interact directly with the machine learning service broker 135. In examples where the machine learning service broker 135 is running in an Edge or On-Premise environment with a firewall, the worker plane manager 115 can communicate with the machine learning service broker 135 through the integration connector 160. An example communication between the worker plane manager 115 and worker plane destinations is described in Example IV.

In one example, the machine learning control plane 105 can include and manage common services 140. The common services 140 can include services to aggregate and monitor various logs and metrics. The common services 140 can include a logging service to obtain deployment and runtime logs of machine learning training and inference. The logs are used to debug in case of error scenarios. The common services 140 can include a machine learning tracking service to obtain machine learning metrics such as accuracy, precision, and recall. The common services 140 can include a metrics service to obtain operational metrics such as CPU, memory, and number of health instances. The common services 140 can include a tracing service to obtain tracing information to understand the time taken at each step of machine learning pipelines. The common services 140 can include an audit service to store audit logs related to security events and security configurations to fulfill compliance requirements.

In one example, the worker plane manager 115 can deploy a common service agent 145 to a registered machine learning worker plane 120. The common service agent 145 can provide system service data to the machine learning control plane 105, or the common services 140 can pull system service data from the common service agents 145 in the machine learning worker planes 120. The common services 140 can perform aggregation of service data received or pulled from the common service agents 145 of the machine learning worker planes 120. The machine learning control plane 105 can include dashboard and tools 150 to view and interact with the aggregated data. The dashboard and tools 150 can allow monitoring, alerting, and debugging.

In examples where the common service agent 145 is running in a cloud environment without a firewall, the worker plane manager 115 can interact directly with the common service agent 145. In examples where the common service agent 145 is running in an Edge or On-Premise environment with a firewall, the worker plane manager 115 can communicate with the common service agent 145 through the integration connector 160.

In one example, the machine learning worker plane 120 is a container runtime environment that is built using computing nodes and that supports creation of pods or containers. In any setup of the machine learning worker plane 120 as a container runtime environment, the machine learning service broker 135 can integrate with container orchestration mechanisms or APIs (e.g., Kubernetes API server and Docker runtimes) and with Hyperscaler APIs (e.g., GCP, AZURE, AWS, etc.) to create and manage machine learning workloads. The machine learning service broker 135 can use the orchestration mechanisms or APIs to create, update, or delete machine learning workloads in the form of pods or containers. An example operation of the machine learning service broker 135 is described in Example V.

In one example, the machine learning services 130 can communicate with a data storage 170, which can be in a cloud and have various object stores. The machine learning services 130 can, for example, store machine learning models and other machine learning artifacts in the object stores. In one example, the machine learning service brokers 135 can also communicate with the data storage 170. For example, the machine learning service brokers 135 can push training data to the data storage 170. The machine learning services 130 can pull the training data from the data storage 170 to train machine learning models. The machine learning service brokers 135 can pull the trained models from the data storage 170 to create machine learning workloads, such as an inference service.

The machine learning control plane 105 can be implemented in a computer system. The machine learning control plane 105 can be stored in one or more computer-readable storage media or computer-readable storage devices and executed by one or more processor units. The technologies described herein can be generic to the specifics of operating systems or hardware and can be applied in any variety of environments to take advantage of the described features.

Example III—Example Method of Deploying a Distributed AI Platform Mesh

Figure 2:
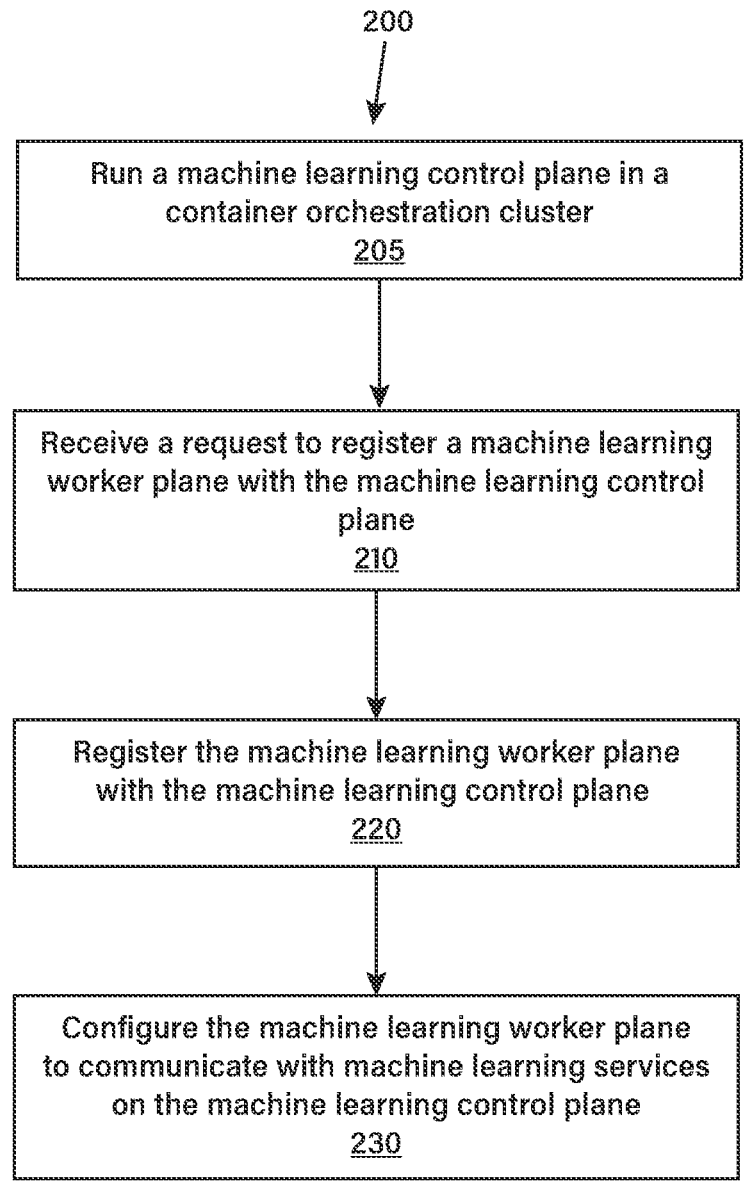
FIG. 2 is a flowchart of an example method of deploying the distributed AI platform mesh.

FIG. 2 is a flowchart of an example method 200 that can be performed, for example, by the distributed AI platform mesh 100 of FIG. 1.

In the example, at 205, the method includes running a machine learning control plane in a container orchestration cluster (e.g., 110 in FIG. 1). The machine learning control plane can be a set of containerized microservices running in replica pods in the container orchestration cluster. The machine learning control plane is configured to orchestrate workload, lifecycle, and operational aspects of a machine learning process as described in Example II. The machine learning control plane includes machine learning services (e.g., 130 in FIG. 1). The machine learning services can include, for example, preprocessing machine learning data, training of machine learning models, deploying trained models (e.g., as a Web service), managing machine learning artifacts (e.g., datasets and models), and managing machine learning workflows.

In the example, at 210, the method includes receiving a request to register a machine learning worker plane (e.g., 120 in FIG. 1) with the machine learning control plane. The machine learning worker plane is a remote runtime environment configured to execute machine learning workloads (e.g., 125 in FIG. 1) as described in Example II. In one example, a worker plane manager (e.g., 115 in FIG. 1) of the machine learning control plane receives the request. For example, the owner of the machine learning worker plane can access a user interface of the worker plane manager via a URL. The owner can enter the metadata, credentials, and configurations (e.g., runtime environment) of the machine learning worker plane in the user interface and submit the request to register the machine learning worker plane via the user interface.

In the example, at 220, the method includes registering the machine learning worker plane with the machine learning control plane. For example, the worker plane manager can store the information provided in the request and authenticate the machine learning worker plane. An example of managing worker plane destinations by the worker plane manager is described in Example IV.

In the example, at 230, the method configures the machine learning worker plane to communicate with machine learning services on the machine learning control plane. For example, after the machine learning worker plane is registered in the worker plane manager, the worker plane manager can automatically deploy a machine learning service broker to the machine learning worker plane. The worker plane manager can further establish a connection between the worker plane manager and the machine learning service broker (depending on the environment in which the machine learning service broker is running) such that the machine learning services can communicate with the machine learning service broker via the worker plane manager. An example communication between the worker plane manager and worker plane destinations is described in Example IV.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "receive" can also be described as "send" from a different perspective.

Example IV—Example Worker Plane Manager Implementation

Figure 3:
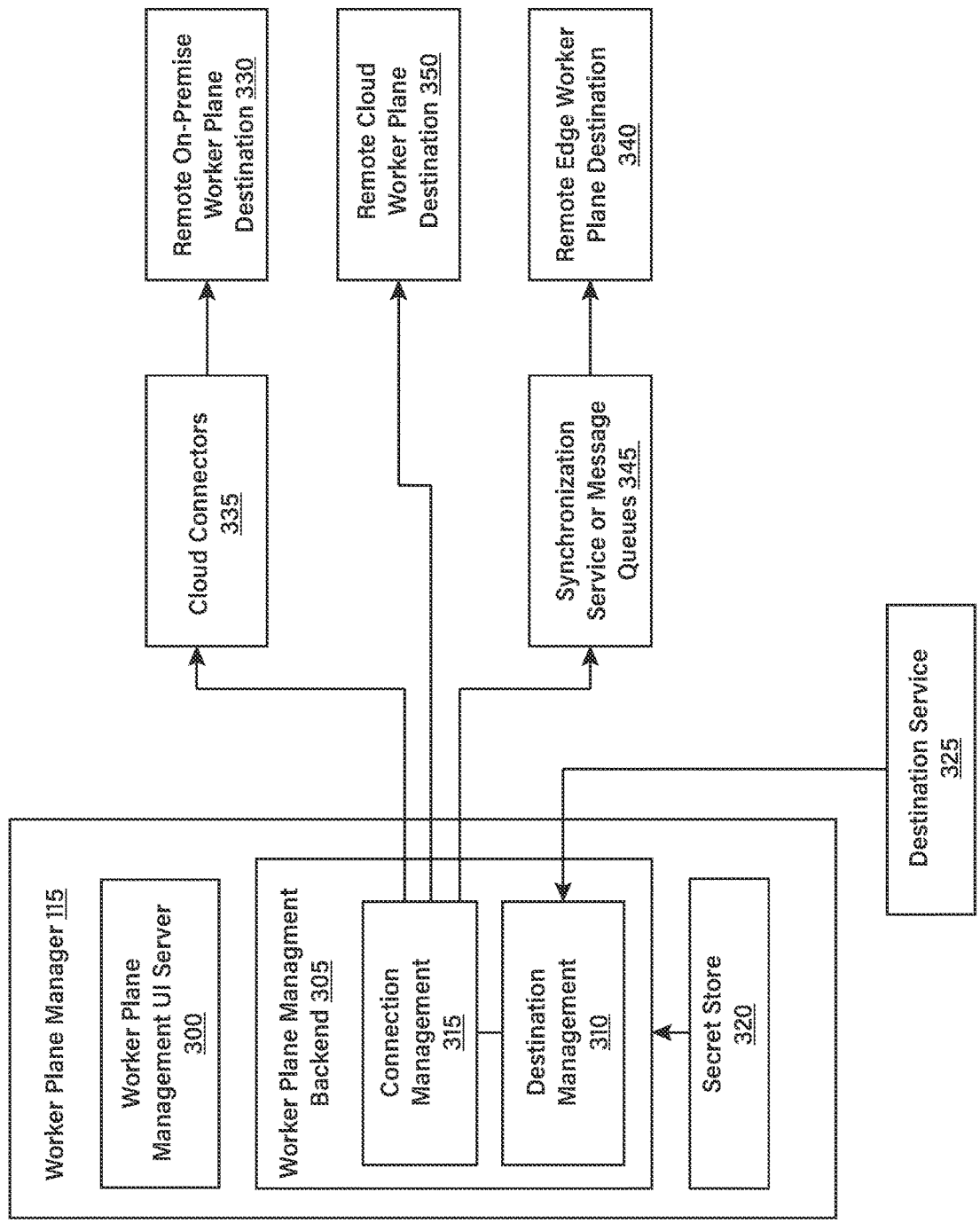
FIG. 3 is a block diagram of an example worker plane manager for a machine learning control plane of the distributed AI platform mesh and connection of the worker plane manager to remote worker plane destinations.

FIG. 3 is a block diagram of an example implementation of the worker plane manager 115 and connection of the worker plane manager 115 to remote worker plane destinations corresponding to machine learning worker planes.

In the example, the worker plane manager 115 includes a worker plane management user interface (UI) server 300 and a worker plane management backend 305. The worker plane management UI server 300 serves the UI content for the worker plane manager. For example, the worker plane management UI server 300 can serve a UI where a user can register a machine learning worker plane. The worker plane management backend 305 provides destination management 310 and connection management 315. The destination management 310 manages worker plane destinations (e.g., information that is required to access a remote service or system from an application). The worker plane destination information can be provided as part of a request to register a machine learning worker plane with the worker plane manager 115. The connection management 315 manages connections between the worker plane manager 115 and machine learning worker planes using the worker plane destination information from the destination management 310.

In one example, the destination management 310 can use a managed destination service 325 (such as SAP Business Technology Platform (BTP) Connectivity service) to store worker plane destination information provided during registration of machine learning worker planes as destinations.

The following is an example of configuration of a worker plane destination using SAP BTP Connectivity service.

```
"destinationConfiguration": {
    "Name": "<NAME OF WORKER PLANE GOES HERE>",
    "Type": "HTTP",
    "URL": "<WORKER PLANE URL GOES HERE>",
    "Authentication": "BasicAuthentication",
    "ProxyType": "OnPremise",
    "Type": "Kubernetes"
}
```

The Authentication Tokens property is applicable to destinations that use the following authentication types: BasicAuthentication, OAuth2SAMLBearerAssertion, OAuth2ClientCredentials, OAuthUserTokenExchange, OAuth2JWTBearer, OAuth2Password, and SAPAssertion-SSO. The Authentication Tokens property can be specified as follows:

```
"authTokens": [
  {
    "type": "Basic",
    "value": "dGVzdDpwYXNzMTIzNDU=",
    "http_header": {
      "key": "Authorization",
      "value": "Basic dGVzdDpwYXNzMTIzNDU="
    }
  }
]
```

The Certificates property is applicable to destinations that use the following authentication types: ClientCertificateAuthentication and OAuth2SAMLBearerAssertion.

```
"certificates": [
  {
    "Name": "keystore.jks",
    "Content": "<value>"
    "Type": "CERTIFICATE"
  }
]
```

In another example, the destination management 310 can store and retrieve the worker plane destination information in the form of a secret (e.g., Kubernetes Secret). A secret can take the form of an object that contains a small amount of sensitive data (e.g., password, token, or key) and can be created independently of the pods or containers that use the data. The secrets can be stored in a secret store 320, which is an object store associated with the worker plane manager 115, and encrypted at rest.

The connection management 315 manages the worker plane connections using the worker plane destination information from the destination management 310. For connection to a remote On-Premise worker plane destination (e.g., worker plane destination 330), the connection management 315 can use cloud connectors 335 to connect the worker plane manager 115 to the worker plane destination. For connection to an Edge worker plane destination (e.g., worker plane destination 340), the connection management 315 can use a bidirectional communication service, such as a synchronization service or message queue 345 (e.g., SAP Cloud Connector, SAP Business object sync service, RabbitMQ Message Queue, Kafka, etc.), to connect the worker plane manager 115 to the worker plane destination. For connection to a remote Cloud worker plane destination (e.g., worker plane destination 350), the connection management 315 can use Hypertext Transfer Protocol Secure (HTTPS) connection directly to connect the worker plane manager 115 to the worker plane destination.

When a user registers a machine learning worker plane with the worker plane manager 115 via a UI served by the worker plane management UI server 300, the user provides the technical information to access the machine learning worker plane. The destination management 310 manages the worker plane destination information, and the connection management 315 manages the connection between the worker plane manager 115 and the machine learning worker plane using the information managed by the destination management 310.

Example V—Example Machine Learning Service Broker Operation

Figure 4:
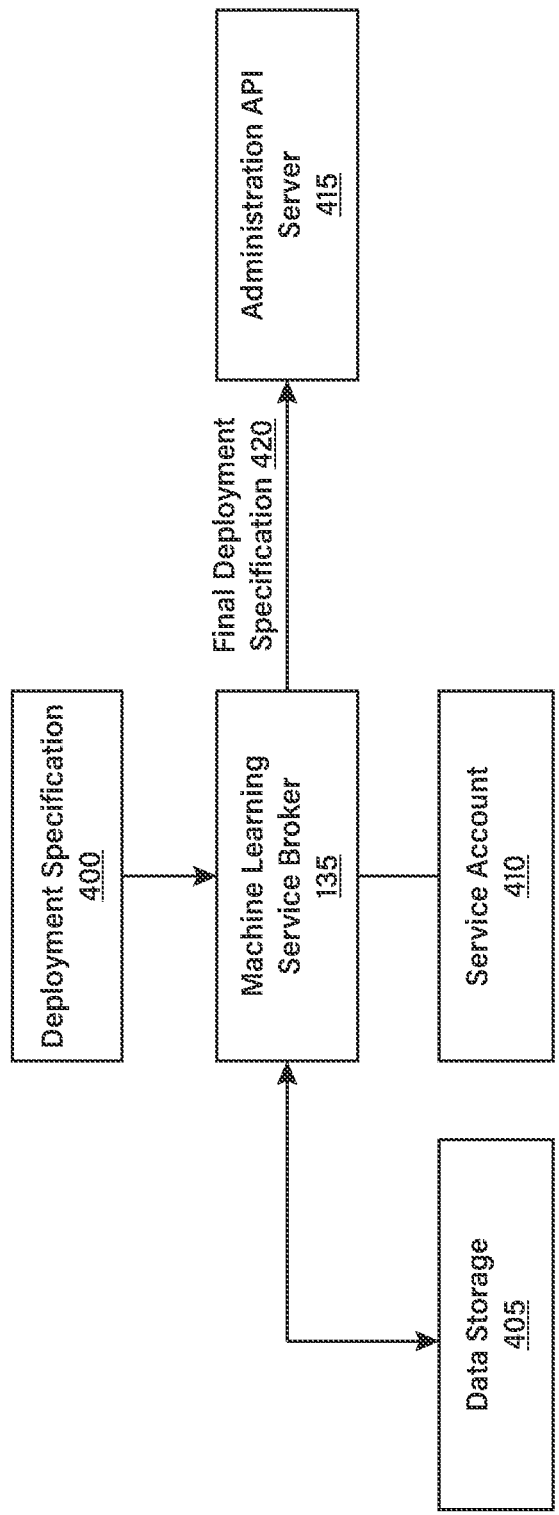
FIG. 4 is a block diagram illustrating an example operation of a machine learning service broker on a machine learning worker plane of the distributed AI platform mesh.

FIG. 4 is a block diagram of example operation of the machine learning service broker 135 on a machine learning worker plane.

In the example, the machine learning service broker 135 can receive an input deployment specification 400 in a structured format (e.g., in YAML or JSON format) from the machine learning services (130 in FIG. 1) on the machine learning control plane (105 in FIG. 1). The input deployment specification can include a command to generate a machine learning workload on the machine learning worker plane. Upon receiving the input deployment specification 400, the machine learning services broker 135 pulls the artifacts (e.g., machine learning model) specified in the input deployment specification 400 to a local data storage 405. The machine learning service broker 135 can update the artifact details in the input deployment specification 400 using local path references. The machine learning service broker 135 can transform the input deployment specification 400 into a final deployment specification 420 having a format expected by the underlying container runtime environment.

The machine learning service broker 135 can connect to an administration API server 415 (e.g., Kubernetes API server, Docker Swarm API Server, Azure APIs, etc.) in the machine learning worker plane using information in an associated service account 410. The machine learning service broker 135 can provide the final deployment specification 420 to the administration API server 415. The administration API server 415 is responsible for creating containerized workloads on the machine learning worker plane based on the final deployment specification 420. Storage of the final deployment specification 420 can be delegated to the administration API server 415.

The following is an example input deployment specification 400 for a machine learning service broker 135 in a Kubernetes based worker plane. The specification is for an inference service and includes a location of the machine learning model that would provide the inference.

```
apiVersion: "serving.kserve.io/v1beta1"
kind: "InferenceService"
metadata:
    name: "tensorflow-gpu"
spec:
    predictor:
      tensorflow:
        storageUri: "gs://kfserving-samples/models/tensorflow/flowers"
```

The following is an example final transformed deployment specification 420 for the Kubernetes API Server:

```
apiVersion: "apps/v1"
kind: "Deployment"
metadata:
    name: "tensorflow-gpu"
    namespace: "ai-worker-plane"
spec:
    replicas: 1
    template:
        spec:
            containers:
            - name: kfserving-container
              image: gcr.io/kfserving/tensorflowserver@sha256:digest
              ports:
              - containerPort: 9000
```

Figure 5:
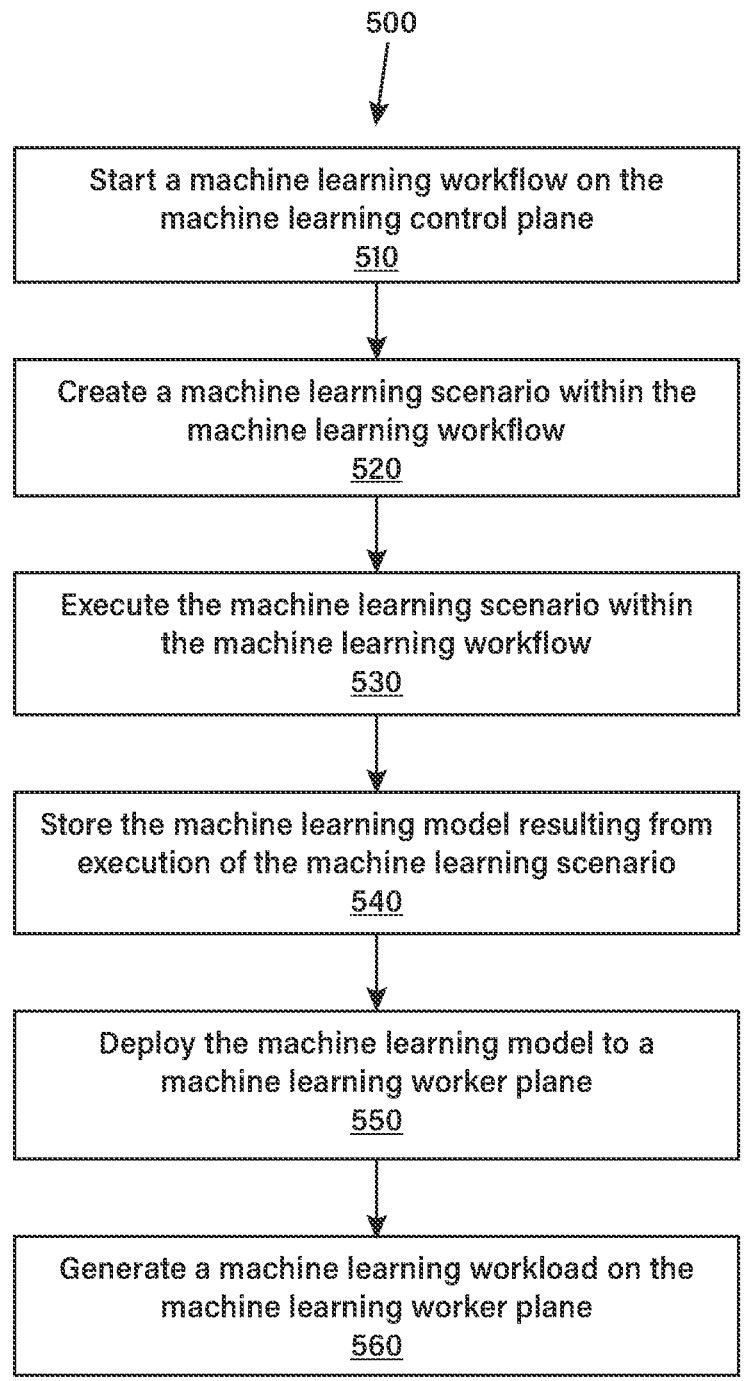
FIG. 5 is a flowchart of an example machine learning workflow with the distributed AI platform mesh.

Example VI—Example Machine Learning Workflow with a Distributed AI Platform Mesh FIG. 5 is a flowchart of an example method 500 that can be performed, for example, by the distributed AI platform mesh 100 of FIG. 1. In the example, a machine learning worker plane has been connected to a machine learning control plane as described in Example III.

In the example, at 510, the method includes starting a machine learning workflow on the machine learning control plane. For example, a user can start the machine learning workflow by accessing a cloud application that is connected to the machine learning control plane (e.g., 105 in FIG. 1). The user can access the cloud application from a machine learning worker plane (e.g., 120 in FIG. 1) that is registered with the machine learning control plane. The user can use the cloud application to create a resource group for the machine learning workflow in the machine learning control plane. The user can register an object store to associate with the resource group in a data storage (e.g., 170 in FIG. 1) in a cloud. The user can push training data into the object store.

In the example, at 520, the method includes creating a machine learning scenario (or multiple machine learning scenarios) within the machine learning workflow. For example, the machine learning scenario(s) can be created via the cloud application and using templates. An example of a template is described in Example VIII. A machine learning scenario specifies one or more machine learning services to be applied to machine learning artifacts (e.g., training data and models) and the parameters for the machine learning services. In one example, a machine learning scenario can specify training of a machine learning model using the training data pushed into the object store. In the context of training a machine learning model, a machine learning scenario can be either a simple machine learning job or a complex training workflow/pipeline (e.g., with preprocessing step, model training step, model evaluation step, metrics storage step, and model storage step).

In the example, at 530, the method includes executing the machine learning scenario within the machine learning workflow. The machine learning scenario can be executed in the resource group created for the machine learning workflow. In one example, the machine learning scenario can involve training a machine learning model, which can be simple training or complex training.

In the example, at 540, the method stores the machine learning model resulting from the execution of the machine learning scenario in the object store.

In the example, at 550, the method can include deploying the machine learning model to the machine learning worker plane. In one example, a user can trigger deployment of the machine learning model. In other examples, the machine learning service broker can trigger deployment of the machine learning model. For example, when the machine learning service broker detects that execution of the machine learning scenario is complete or that the machine learning service has been stored in the object store, the machine learning service broker can trigger deployment of the machine learning model.

During deployment of the machine learning model, the machine learning control plane can communicate various deployment information to the machine learning services broker (e.g., the machine learning control plane can communicate model information such as location, path, version; runtime environment information such as DOCKER image; resource requirements; and other application context such as traffic split to various models, HTTP, or gRPC protocol to the machine learning services broker). The machine learning control plane can generate a deployment specification including the deployment information and transmit the deployment specification to the machine learning services broker via the worker plane manager.

The machine learning service broker can pull the machine learning model into the machine learning worker plane using the information communicated by the machine learning control plane. The machine learning service broker can store the machine learning model in a data storage associated with the machine learning worker plane.

In the example, at 560, the method can include generating a machine learning workload on the machine learning worker plane. The machine learning workload can be, for example, an inference service based on the machine learning model deployed to the machine learning worker plane. The inference service will allow input data to be fed to the trained model in order to obtain a prediction from the trained model. The inference service can generate other information besides the prediction, such as explainability of the model or prediction, and combine the other information with the prediction to make an inference. The inference service can be exposed (e.g., via an API) to continually receive input data and generate inferences.

Figure 6:
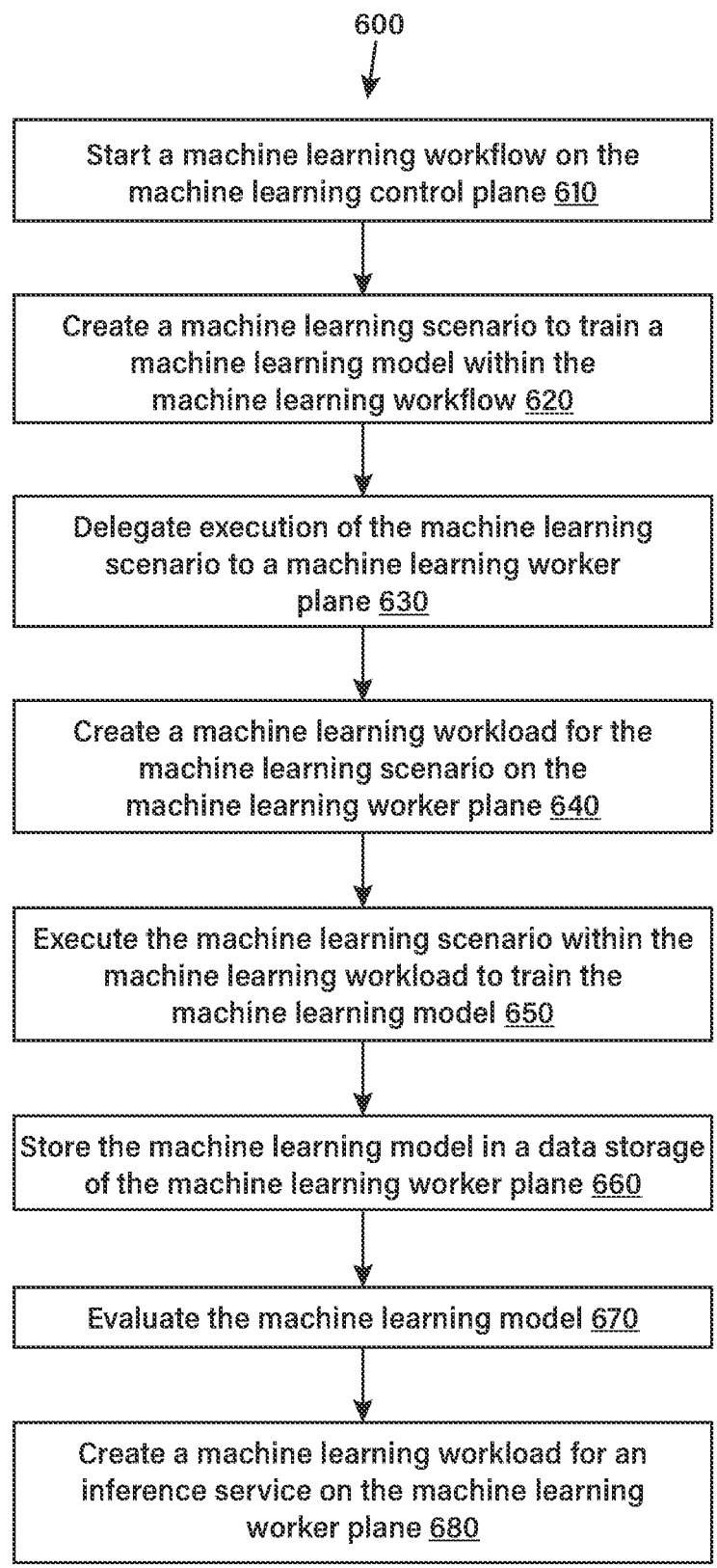
FIG. 6 is a flowchart of another example machine learning workflow with the distributed AI platform mesh.

Example VII—Example Machine Learning Workflow with a Distributed AI Platform Mesh FIG. 6 is a flowchart of an example method 600 that can be performed, for example, by the distributed AI platform mesh 100 of FIG. 1. In the example, a machine learning worker plane has been connected to a machine learning control plane as described in Example III.

In the example, at 610, the method includes starting a machine learning workflow on the machine learning control plane (e.g., 105 in FIG. 1). For example, a user can start the machine learning workflow by accessing a cloud application that is connected to the machine learning control plane. The user can access the cloud application from a machine learning worker plane that is registered with the machine learning control plane. The user can use the cloud application to create a resource group for the machine learning workflow in the machine learning control plane. The user can register an object store to associate with the resource group in a data storage (e.g., 170 in FIG. 1) in a cloud.

In the example, at 620, the method includes creating a machine learning scenario to train a machine learning model within the machine learning workflow. A user can create the machine learning scenario via the cloud application and using templates. An example of a template is described in Example VIII. The machine learning scenario can be either a simple machine learning job or a complex training workflow/pipeline (e.g., with preprocessing step, model training step, model evaluation step, metrics storage step, and model storage step).

In the example, at 630, the method includes delegating execution of the machine learning scenario to the machine learning worker plane. The machine learning control plane can create a deployment specification of the machine learning scenario within the machine learning workflow. Using the worker plane manager, the machine learning control plane can transmit the deployment specification to the machine learning service broker on the machine learning worker plane.

In the example, at 640, the method includes creating a machine learning workload for the machine learning scenario on the machine learning worker plane. When the machine learning service broker receives the deployment specification, the machine learning service broker can pull any artifacts indicated in the deployment specification into a local data storage of the machine learning worker plane. The machine learning service broker can adjust any local path references in the deployment specification and generate a final deployment specification that can be served to an administration API server for the machine learning worker plane. The administration API server then creates and manages the machine learning workload.

In the example, at 650, the method includes executing the machine learning scenario within the machine learning workload to train the machine learning model. During the training of the machine learning model, the machine learning worker plane sends the training status, training machine learning metrics, and logs to the machine learning control plane. Communication of the status, metrics, and log information to the machine learning control plane can be managed by the common service agent (145 in FIG. 1). The common services (e.g., 140 in FIG. 1) on the machine learning control plane can receive the information via the worker plane manager.

In the example, at 660, the method can include storing the machine learning model resulting from executing the machine learning scenario in the data storage of the machine learning worker plane.

In the example, at 680, the method can include creating a machine workload for an inference service on the machine learning worker plane. The machine workload can be created if the machine learning model is found to be satisfactory in operation 670 or in order to evaluate the machine learning model. The machine learning control plane can send a command to the machine learning services broker to create the machine workload for the inference service. The inference service can allow input data to be fed to the machine learning model in order to obtain a prediction from the machine learning model. The inference service can generate other information in addition to the prediction, such as explainability of the model or prediction, and combine the other information with the prediction to make an inference. The inference service can be exposed (e.g., via an API) to continually receive input data and generate inferences.

Example VIII—Machine Learning Services Template

The templates for creating machine learning scenarios can be stored in the machine learning control plane (105 in FIG. 1) and can be provided via APIs of the machine learning services (130 in FIG. 1). The following is an example of a template:

```
apiVersion: ai.sap.com/v1alpha1
kind: ServingTemplate
metadata:
    name: text-clf-infer-tutorial
    annotations:
        scenarios.ai.sap.com/description: "SAP developers tutorial scenario"
        scenarios.ai.sap.com/name: "text-clf-tutorial-scenario"
        executables.ai.sap.com/description: "Inference executable for text classification with Scikit-learn"
        executables.ai.sap.com/name: "text-clf-infer-tutorial-exec"
    labels:
        scenarios.ai.sap.com/id: "text-clf-tutorial"
        executables.ai.sap.com/id: "text-clf-infer-tutorial"
        ai.sap.com/version: "1.0.0"
spec:
    inputs:
        parameters: [ ]
        artifacts:
            - name: textmodel
    template:
        spec: |
            predictor:
                minReplicas: 1
                containers:
                - name: kfserving-container
                  image: "<DOCKER IMAGE URL GOES HERE>"
                  ports:
                    - containerPort: 9001
                      protocol: TCP
                  env:
                    - name: STORAGE_URI
                      value: "{ {inputs.artifacts.textmodel} }"
```

In the example, at 670, the method can include evaluating the training of the machine learning model. For example, the training in operation 650 produces machine learning tracking metrics (e.g., accuracy, precision, recall, bias, variance, etc.). Graphs and charts and/or other representation of data can be generated from these metrics. During evaluation, a user (e.g., a data scientist) can evaluate the representation(s) of the metrics and determine whether the training of the model is satisfactory. The user can also send evaluation data against the machine learning model and compare the inference result with expected outcome.

Example Computing Systems

Figure 7:
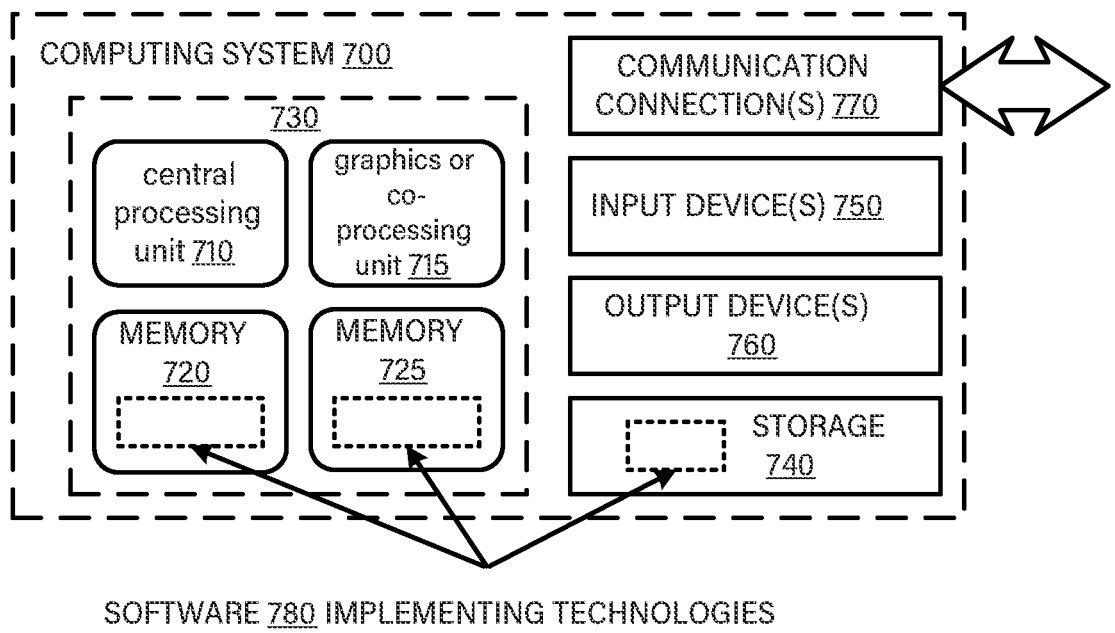
FIG. 7 is a block diagram of an example computing system in which described technologies can be implemented.

FIG. 7 depicts an example of a suitable computing system 700 in which the described innovations can be implemented. The computing system 700 is not intended to suggest any limitation as to scope of use or functionality of the present disclosure, as the innovations can be implemented in diverse computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions, such as for implementing the features described in the examples herein. A processing unit can be a general-purpose central processing unit (CPU), processor in an application-specific integrated circuit (ASIC), graphics processing unit (GPU), tensor processing unit (TPU), quantum processor, or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 can be volatile memory (e.g., registers, cache, RAM), non-volatile memory (e.g., ROM, EEPROM, flash memory, etc.), or some combination of the two, accessible by the processing unit(s) 710, 715. The memory 720, 725 stores software 780 implementing one or more innovations described herein, in the form of computer-executable instructions suitable for execution by the processing unit(s) 710, 715.

A computing system 700 can have additional features. For example, the computing system 700 includes storage 740, one or more input devices 750, one or more output devices 760, and one or more communication connections 770, including input devices, output devices, and communication connections for interacting with a user. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 can be removable or non-removable, and includes magnetic disks, magnetic tapes or cassettes, CD-ROMs, DVDs, or any other medium which can be used to store information in a non-transitory way and which can be accessed within the computing system 700. The storage 740 stores instructions for the software 780 implementing one or more innovations described herein.

The input device(s) 750 can be an input device such as a keyboard, mouse, pen, or trackball, a voice input device, a scanning device, touch device (e.g., touchpad, display, or the like) or another device that provides input to the computing system 700. The output device(s) 760 can be a display, printer, speaker, CD-writer, or another device that provides output from the computing system 700, e.g., actuators or some mechanical devices like motors, 3D printers, and the like.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer and should not be confused with acts performed by a human being. The actual computer operations corresponding to these terms vary depending on implementation.

Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing system to perform the method. The technologies described herein can be implemented in a variety of programming languages.

Example Cloud Computing Environment

Figure 8:
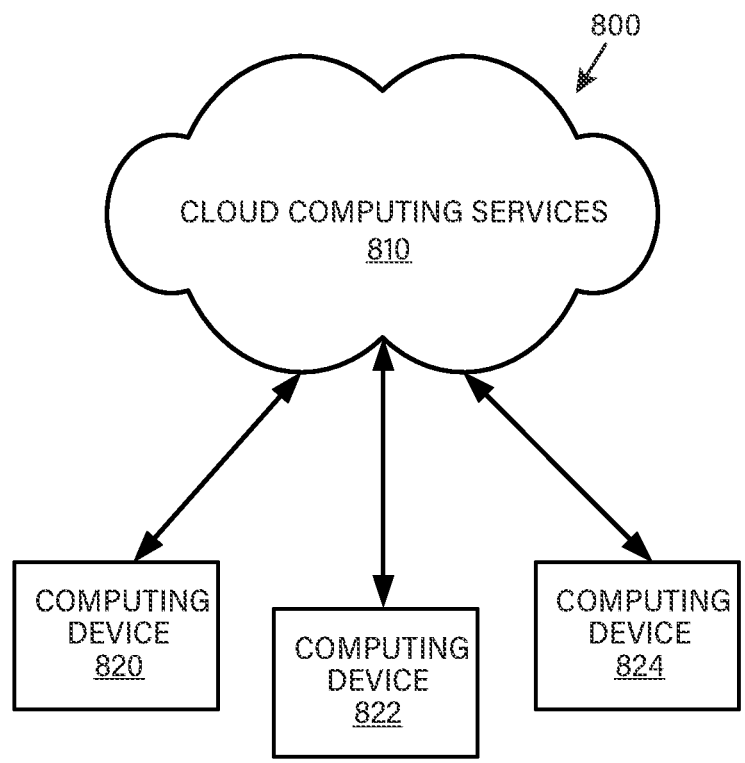
FIG. 8 is a block diagram of an example cloud computing environment that can be used in conjunction with the technologies described herein.

FIG. 8 depicts an example cloud computing environment 800 in which the described technologies can be implemented, including, e.g., the systems described herein. The cloud computing environment 800 comprises cloud computing services 810. The cloud computing services 810 can comprise various types of cloud computing resources, such as computer servers, data storage repositories, networking resources, etc. The cloud computing services 810 can be centrally located (e.g., provided by a data center of a business or organization) or distributed (e.g., provided by various computing resources located at different locations, such as different data centers and/or located in different cities or countries).

The cloud computing services 810 are utilized by various types of computing devices (e.g., client computing devices), such as computing devices 820, 822, and 824. For example, the computing devices (e.g., 820, 822, and 824) can be computers (e.g., desktop or laptop computers), mobile devices (e.g., tablet computers or smart phones), or other types of computing devices. For example, the computing devices (e.g., 820, 822, and 824) can utilize the cloud computing services 810 to perform computing operations (e.g., data processing, data storage, and the like).

In practice, cloud-based, on-premises-based, or hybrid scenarios can be supported.

Additional Examples

Additional examples based on principles described herein are enumerated below. Further examples falling within the scope of the subject matter can be configured by, for example, taking one feature of an example in isolation, taking more than one feature of an example in combination, or combining one or more features of one example with one or more features of one or more other examples.

Example 1 is a system comprising a machine learning control plane deployed in a first computing environment, the machine learning control plane comprising a worker plane manager and a set of machine learning services, the worker plane manager comprising a service to register a remote runtime environment and a service to communicate with the remote runtime environment once registered; and a machine learning worker plane deployed in a second computing environment that is remote to the first computing environment, wherein the machine learning worker plane is a remote runtime environment configured to execute machine learning workloads, and wherein the machine learning worker plane is registered with the machine learning control plane via the worker plane manager.

Example 2 includes the subject matter of Example 1, wherein the first computing environment comprises a container orchestration cluster, and wherein the machine learning control plane is hosted in the container orchestration cluster.

Example 3 includes the subject matter of Example 2, wherein the machine learning control plane comprises a set of containerized microservices running in replica pods in the container orchestration cluster.

Example 4 includes the subject matter of any one of Examples 1-3, wherein the machine learning worker plane comprises a machine learning service broker configured to create and manage machine learning workloads on the machine learning worker plane.

Example 5 includes the subject matter of Example 4, wherein the machine learning service broker integrates with one or more container orchestration APIs to manage the machine learning workloads on the machine learning worker plane.

Example 6 includes the subject matter of Example 5, wherein the machine learning service broker integrates with one or more hyperscaler APIs to manage the machine learning workloads on the machine learning worker plane.

Example 7 includes the subject matter of any one of Examples 4-6, wherein the machine learning workloads comprise an inference service.

Example 8 includes the subject matter of any one of Examples 4-7, wherein the machine learning service broker is communicatively coupled to the set of machine learning services through the worker plane manager.

Example 9 includes the subject matter of Example 8, wherein the machine learning service broker is connected to the worker plane manager via a synchronization service or a message queue service.

Example 10 includes the subject matter of any one of Examples 1-9, wherein the set of machine learning services comprises services to preprocess machine learning data, train machine learning models, deploy trained models, manage machine learning artifacts, and manage machine learning workflows.

Example 11 includes the subject matter of any one of Examples 1-10, wherein the second computing environment is an edge computing environment, a public cloud computing environment, or a private cloud computing environment.

Example 12 includes the subject matter of any one of Examples 1-11, wherein the machine learning control plane further comprises a set of common services comprising a logging service, a machine learning tracking service, a metrics service, a tracing service, and an audit service.

Example 13 includes the subject matter of Example 12, wherein the machine learning worker plane further comprises a common service agent configured to broadcast system data from the machine learning worker plane to the set of common services, and wherein the common service agent is communicatively coupled to the set of common services via the worker plane manager.

Example 14 is a method comprising running a machine learning control plane in a container orchestration cluster, wherein the machine learning control plane comprises a worker plane manager and a set of machine learning services; receiving a request to register a machine learning worker plane with the machine learning control plane, wherein the machine learning worker plane is a remote runtime environment configured to execute machine learning workloads; registering the machine learning worker plane in the worker plane manager; and configuring a communication connection between the worker plane manager and a machine learning service broker within the machine learning worker plane.

Example 15 includes the subject matter of Example 14, and further comprises creating a machine learning scenario within a machine learning workflow on the machine learning control plane, the machine learning scenario comprising one or more machine learning services to apply to one or more machine learning artifacts.

Example 16 includes the subject matter of Example 15, and further comprises executing the machine learning scenario on the machine learning control plane; and communicating information about the execution of the machine learning scenario from the machine learning control plane to the machine learning worker plane via the communication connection.

Example 17 includes the subject matter of any one of Examples 15-16, wherein the one or more machine learning artifacts comprise a machine learning model, and wherein the one or more machine learning services comprise training the machine learning model.

Example 18 includes the subject matter of Example 17, and further comprises creating a machine learning workload on the machine learning worker plane for an inference service based on the machine learning model.

Example 19 includes the subject matter of Example 17, and further comprises delegating training of the machine learning model to the machine learning worker plane.

Example 20 is one or more non-transitory computer-readable storage media storing computer-executable instructions for causing a computer system to perform operations comprising receiving a first request at a machine learning control plane deployed in a container orchestration cluster to register a remote runtime environment configured to execute machine learning workloads; registering the remote runtime environment at the machine learning control plane; receiving a second request at the machine learning control plane, the second request comprising a machine learning scenario specifying one or more machine learning services of the machine learning control plane; executing the machine learning scenario on the machine learning control plane; communicating information about execution of the machine learning service from the machine learning control plane to the remote runtime environment; and communicating information about machine learning workloads on the remote runtime environment to the machine learning control plane.

Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

The invention claimed is:

1. A system comprising:
 a machine learning control plane deployed in a first computing environment comprising a first hardware processor and a first memory coupled to the first hardware processor, the machine learning control plane comprising a worker plane manager and a set of machine learning services, the worker plane manager comprising a service to register a remote runtime environment and a service to communicate with the remote runtime environment once registered; and
 a machine learning worker plane deployed in a second computing environment that is remote to the first computing environment, the second computing environment comprising a second hardware processor and a second memory coupled to the second hardware processor, wherein the machine learning worker plane is a remote runtime environment configured to execute machine learning workloads, and wherein the machine learning worker plane is registered with the machine learning control plane via the worker plane manager and comprises a machine learning service broker configured to create and manage machine learning workloads on the machine learning worker plane, wherein the machine learning service broker integrates with one or more container orchestration APIs and hyperscaler APIs to manage the machine learning workloads on the machine learning worker plane.

2. The system of claim 1, wherein the first computing environment comprises a container orchestration cluster, and wherein the machine learning control plane is hosted in the container orchestration cluster.

3. The system of claim 2, wherein the machine learning control plane comprises a set of containerized microservices running in replica pods in the container orchestration cluster.

4. The system of claim 1, wherein the machine learning workloads comprise an inference service.

5. The system of claim 1, wherein the machine learning service broker is communicatively coupled to the set of machine learning services through the worker plane manager.

6. The system of claim 5, wherein the machine learning service broker is connected to the worker plane manager via a synchronization service or a message queue service.

7. The system of claim 1, wherein the set of machine learning services comprises services to preprocess machine learning data, train machine learning models, deploy trained models, manage machine learning artifacts, and manage machine learning workflows.

8. The system of claim 1, wherein the second computing environment is an edge computing environment, a public cloud computing environment, or a private cloud computing environment.

9. The system of claim 1, wherein the machine learning control plane further comprises a set of common services comprising a logging service, a machine learning tracking service, a metrics service, a tracing service, and an audit service.

10. The system of claim 9, wherein the machine learning worker plane further comprises a common service agent configured to broadcast system data from the machine learning worker plane to the set of common services, and wherein the common service agent is communicatively coupled to the set of common services via the worker plane manager.

11. A method comprising:
 running a machine learning control plane in a container orchestration cluster, wherein the machine learning control plane comprises a worker plane manager and a set of machine learning services;
 receiving a request to register a machine learning worker plane with the machine learning control plane, wherein the machine learning worker plane is a remote runtime environment configured to execute machine learning workloads, and wherein the machine learning worker plane comprises a machine learning service broker configured to create and manage machine learning workloads on the machine learning worker plane;
 registering the machine learning worker plane in the worker plane manager, wherein the machine learning service broker integrates with one or more container orchestration APIs and integrates with one or more hyperscaler APIs to manage the machine learning workloads on the machine learning worker plane; and
 configuring a communication connection between the worker plane manager and a machine learning service broker within the machine learning worker plane.

12. The method of claim 11, further comprising creating a machine learning scenario within a machine learning workflow on the machine learning control plane, the machine learning scenario comprising one or more machine learning services to apply to one or more machine learning artifacts.

13. The method of claim 12, further comprising:
 executing the machine learning scenario on the machine learning control plane; and
 communicating information about the execution of the machine learning scenario from the machine learning control plane to the machine learning worker plane via the communication connection.

14. The method of claim 12, wherein the one or more machine learning artifacts comprise a machine learning model, and wherein the one or more machine learning services comprise training of the machine learning model.

15. The method of claim 14, further comprising creating a machine learning workload on the machine learning worker plane for an inference service based on the machine learning model.

16. The method of claim 14, further comprising delegating the training of the machine learning model to the machine learning worker plane.

17. One or more non-transitory computer-readable storage media storing computer-executable instructions for causing a computer system to perform operations comprising:
 receiving a first request at a machine learning control plane deployed in a container orchestration cluster to register a remote runtime environment configured to execute machine learning workloads;
 registering the remote runtime environment at the machine learning control plane;
 receiving a second request at the machine learning control plane, the second request comprising a machine learning scenario specifying one or more machine learning services of the machine learning control plane;

executing the machine learning scenario on the machine learning control plane;

communicating information about execution of the machine learning service from the machine learning control plane to the remote runtime environment; and configuring a machine learning service broker within the remote runtime environment to create and manage machine learning workloads on the remote runtime environment, wherein the machine learning service broker integrates with one or more container orchestration APIs to manage the machine learning workloads on the remote runtime environment and integrates with one or more hyperscaler APIs to manage the machine learning workloads on the remote runtime environment; and communicating information about machine learning workloads on the remote runtime environment to the machine learning control plane.

\* \* \* \* \*